United States Patent
Shin et al.

(10) Patent No.: US 7,230,667 B2
(45) Date of Patent: Jun. 12, 2007

(54) LIQUID CRYSTAL DISPLAY

(75) Inventors: Kyoung-Ju Shin, Yongin-si (KR); Chong-Chul Chai, Seoul (KR)

(73) Assignee: Samsung Electronics Co., Ltd. (KR)

( * ) Notice: Subject to any disclaimer, the term of this patent is extended or adjusted under 35 U.S.C. 154(b) by 245 days.

(21) Appl. No.: 10/948,701

(22) Filed: Sep. 23, 2004

(65) Prior Publication Data

US 2005/0068477 A1 Mar. 31, 2005

(30) Foreign Application Priority Data

Sep. 25, 2003 (KR) .................... 10-2003-0066483

(51) Int. Cl.
*G02F 1/1343* (2006.01)
(52) U.S. Cl. ...................... 349/146; 349/144
(58) Field of Classification Search ............... 349/146, 349/144
See application file for complete search history.

(56) References Cited

U.S. PATENT DOCUMENTS 6,888,604 B2 * 5/2005 Rho et al. ................. 349/146

* cited by examiner

*Primary Examiner*—David Nelms
*Assistant Examiner*—David Y. Chung
(74) *Attorney, Agent, or Firm*—Cantor Colburn LLP

(57) ABSTRACT

A liquid crystal display comprising an insulating substrate; a plurality of gate lines formed on the insulating substrate; a plurality of data lines formed on the insulating substrate and crossing the gate lines; a plurality of switching elements connected to the gate lines and data lines; and a plurality of pixel electrodes connected to the switching element, and wherein dots each having a red, green, blue, and white pixels are successively arranged, the ratios the liquid crystal capacitance, the storage capacitance, the parasitic capacitance, and ratio of channel width and length (W/L) of the switching elements between the red and green pixels and the blue and white pixels are same is provided.

12 Claims, 13 Drawing Sheets

LIQUID CRYSTAL DISPLAY

BACKGROUND OF THE INVENTION (a) Field of the Invention

The present invention relates to a liquid crystal display (LCD), and in particular, to a four color filter (RGBW) LCD.

(b) Description of the Related Art

An LCD is one of the most popular flat panel displays. Generally, a liquid crystal display has two substrates with electrodes, and a liquid crystal layer sandwiched between the two substrates. Voltages are applied to the electrodes so that the liquid crystal molecules in the liquid crystal layer are re-oriented to thereby control light transmission.

A basic LCD has two substrates respectively having electrodes for producing an electric field. One of the two substrates has a plurality of pixel electrodes arranged in a matrix shape, and the other has a common electrode covering the entire display area of the substrate.

The liquid crystal display has a plurality of pixels with pixel electrodes and color filters of red, green, and blue. The pixels are driven by way of signals applied through the wiring lines. The wiring lines include scanning signal lines or gate lines for carrying scanning signals, and picture signal lines or data lines for carrying the picture signals. Thin film transistors are formed at the respective pixels while each is connected to one gate line and one data line. The picture signals applied to the pixel electrodes are controlled by way of the thin film transistors.

There are several types of arrangement with the color filters of red, green, and blue. Among them are a stripe type where the color filters of the same color are arranged at the respective pixel columns; a mosaic type where the color filters of red, green, and blue are sequentially arranged in the pixel row and column directions; and a delta type where the pixels are zigzag-alternated in the pixel column direction, and the color filters of red, green, and blue are sequentially arranged at the pixels. In the case of the delta type, the three unit pixels with the color filters of red, green, and blue are operated as one dot, and this makes it easy to express a circle or a diagonal line.

The Clairvoyante, Inc. laboratories have proposed a pixel arrangement structure called the "PenTile Matrix™," which has a high resolution expression capacity advantageous in displaying pictures while involving minimized design cost. In such a pixel arrangement structure, the unit pixel of blue is common to two dots, and the neighboring blue pixels receive the data signals from one data driving IC while being driven by two different gate driving ICs. With the use of the PenTile Matrix pixel structure, the resolution of the UXGA level can be realized by way of a display device of the SVGA level. Furthermore, the number of low-cost gate driving ICs is increased, but the number of high-cost data driving ICs is decreased. This minimizes the design cost for the display device.

However, the PenTile Matrix pixel structure has defects such as the arrangement of gate lines and data lines is complex and the aperture ratio is low because the complex gate lines and data lines diminish the aperture area. Further, a difference of pixel area among the red, green, and blue pixels induces a difference of pixel parameters such as storage capacitance (Cst) and liquid crystal capacitance (Clc). This difference of pixel parameters results in display defects such as flicker.

A four color LCD (RGBW LCD) using red (R), green (G), blue (B), and white (W) color filters is being developed for increasing brightness. There are two types of RGBW LCD, which are distinguished by their arrangement of color filters. One is a stripe type and the other is a checkerboard type. In a stripe type of LCD, a dot comprise four pixels of red, green, blue, and white, and the number of data lines is increased by 25% over an LCD using only red, green, and blue color filters. In a checkerboard type, the number of data lines is decreased by 30% with respect to an LCD using only red, green, and blue color filters, but the number of gate lines is increased by twice compared to an LCD using only red, green, and blue color filters. For solving such a problem, a white pixel may share the area of one of the red, green, and blue pixels. In particular, it is appropriate for a blue pixel to share its area with the white pixel.

SUMMARY OF THE INVENTION

The present invention is to provide an LCD having improved image quality.

The present invention provides a liquid crystal display comprising an insulating substrate; a plurality of gate lines formed on the insulating substrate; a plurality of data lines formed on the insulating substrate and crossing the gate lines; a plurality of switching elements connected to the gate lines and data lines; and a plurality of pixel electrodes connected to the switching element, and wherein dots each having red, green, blue, and white pixels are successively arranged, and total capacitance of each pixel, which consists of liquid crystal capacitance and storage capacitance, are equal.

Here, one of the pixels included in a dot may have a different pixel electrode area from the others, or two of the pixels included in a dot have a different pixel electrode area from the others.

The red pixel electrode and the green pixel electrode may have the same area, the blue pixel electrode and the white pixel electrode may have the same area, and the sum of areas of the red and green pixel electrodes may be different from the sum of areas of the blue and white pixel electrodes.

When the ratio of liquid crystal capacitance of the red and green pixels versus the blue and white pixels is a:b and the ratio of storage capacitance of the red and green pixels versus the blue and white pixels is c:b, the equations a+c=b+d and 1/2<c/d<1 are preferably satisfied.

The present invention provides a liquid crystal display comprising an insulating substrate; a plurality of gate lines formed on the insulating substrate; a plurality of data lines formed on the insulating substrate and crossing the gate lines; a plurality of switching elements connected to the gate lines and data lines; and a plurality of pixel electrodes connected to the switching element, and wherein dots each having red, green, blue, and white pixels are successively arranged, liquid crystal capacitance of the red and green pixels is larger than that of the blue and white pixels, parasitic capacitance of the red and green pixels is larger than that of the blue and white pixels, and kick-back voltages of the red, green, blue, and white pixel are equal.

The present invention provides a liquid crystal display comprising an insulating substrate; a plurality of gate lines formed on the insulating substrate; a plurality of data lines formed on the insulating substrate and crossing the gate lines; a plurality of switching elements connected to the gate lines and data lines; and a plurality of pixel electrodes connected to the switching element, and wherein dots each having red, green, blue, and white pixels are successively arranged, and all of the ratios of liquid crystal capacitance, storage capacitance, and the parasitic capacitance between the red and green pixels and the blue and white pixels are the same.

The present invention provides a liquid crystal display comprising an insulating substrate; a plurality of gate lines formed on the insulating substrate; a plurality of data lines formed on the insulating substrate and crossing the gate lines; a plurality of switching elements connected to the gate lines and data lines; and a plurality of pixel electrodes connected to the switching element, and wherein dots each having red, green, blue, and white pixels are successively arranged, the ratios of total capacitance including liquid crystal capacitance and storage capacitance, the parasitic capacitance, and ratio of channel width and length (W/L) of the switching element between the red and green pixels and the blue and white pixels are same.

The present invention provides a liquid crystal display comprising an insulating substrate; a plurality of gate lines formed on the insulating substrate; a plurality of data lines formed on the insulating substrate and crossing the gate lines; a plurality of switching elements connected to the gate lines and data lines; and a plurality of pixel electrodes connected to the switching element, and wherein dots each having red, green, blue, and white pixels are successively arranged, and the ratios the liquid crystal capacitance, the storage capacitance, the parasitic capacitance, and ratio of channel width and length (W/L) of the switching elements between the red and green pixels and the blue and white pixels are the same.

The present invention provides a liquid crystal display comprising an insulating substrate, a plurality of gate lines formed on the insulating substrate, a plurality of data lines formed on the insulating substrate and crossing the gate lines, a plurality of switching elements connected to the gate lines and data lines, and a plurality of pixel electrodes connected to the switching element, wherein red, green, blue, and white pixel electrodes are respectively formed on the red, green, blue, and white pixels; two red pixel electrodes, two green pixel electrodes, one blue pixel electrode, and one white pixel electrode are comprised in a dot; the red and green pixel electrodes are sequentially aligned along a row and column and a blue and white pixel electrodes; the blue and white pixel electrodes form a lozenge extending over two pixel columns; two red pixel electrodes are respectively included in two adjacent pixel columns and face each other obliquely while the lozenge formed of the blue and white pixel electrodes is disposed between them; a data line is disposed between the blue and white pixel electrodes; the blue and white pixel electrodes are respectively connected to the switching elements; and the ratios the liquid crystal capacitance, the storage capacitance, the parasitic capacitance, and the ratios of channel width and length (W/L) of the switching elements between the red and green pixels and the blue and white pixels are the same.

BRIEF DESCRIPTION OF THE DRAWINGS

The above and other advantages of the present invention will become more apparent by describing preferred embodiments thereof in detail with reference to the accompanying drawings, in which.

DETAILED DESCRIPTION OF THE PREFERRED EMBODIMENTS

Figure 1:
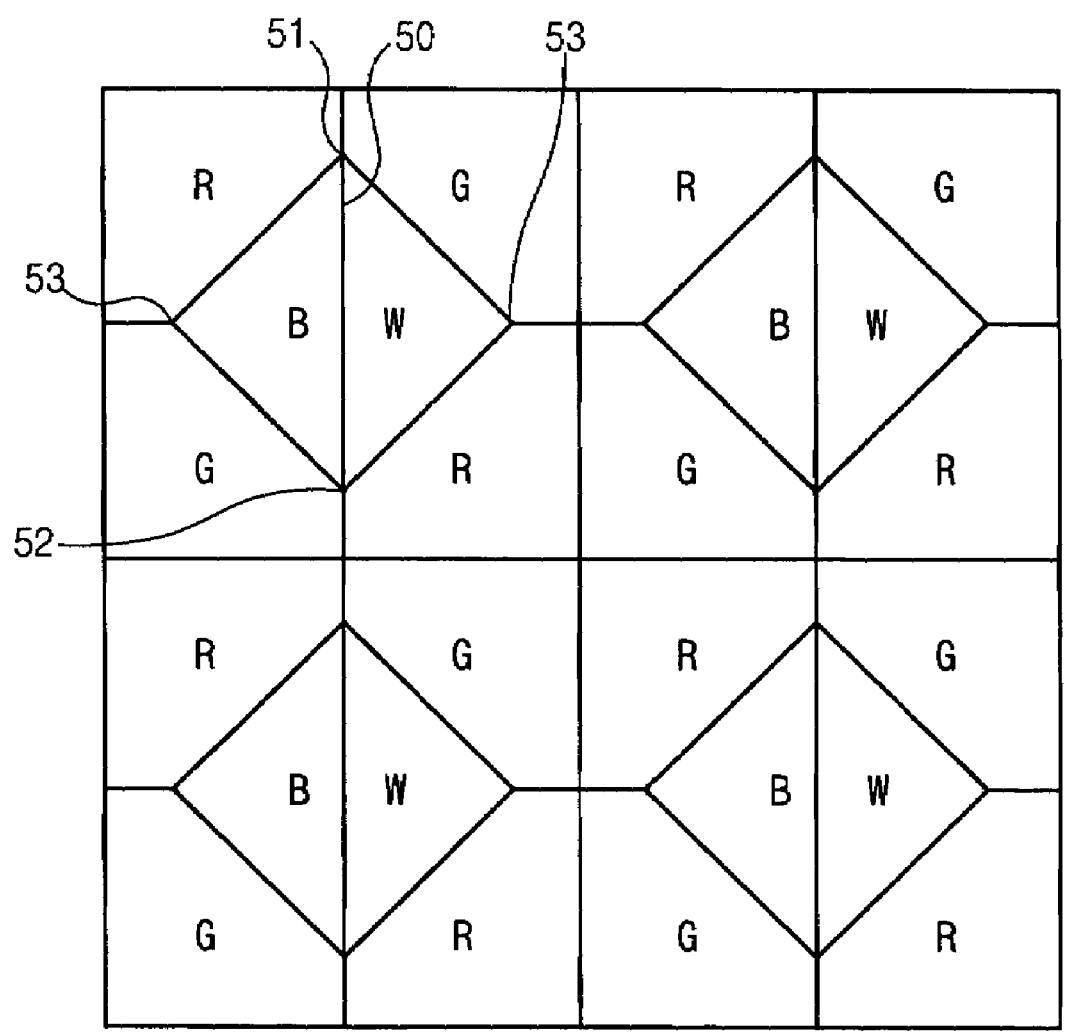
FIG. 1 is a pixel layout of an LCD according to a first exemplary embodiment of the present invention.

The present invention will now be described more fully hereinafter with reference to the accompanying drawings, in which preferred embodiments of the invention are shown. The present invention may, however, be embodied in many different forms and should not be construed as being limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

In contrast, when an element is referred to as being "directly on" another element, there are no intervening elements present.

An LCD according to a first exemplary embodiment of the present invention will be described with reference to FIGS. 1 to 3b.

Figure 2:
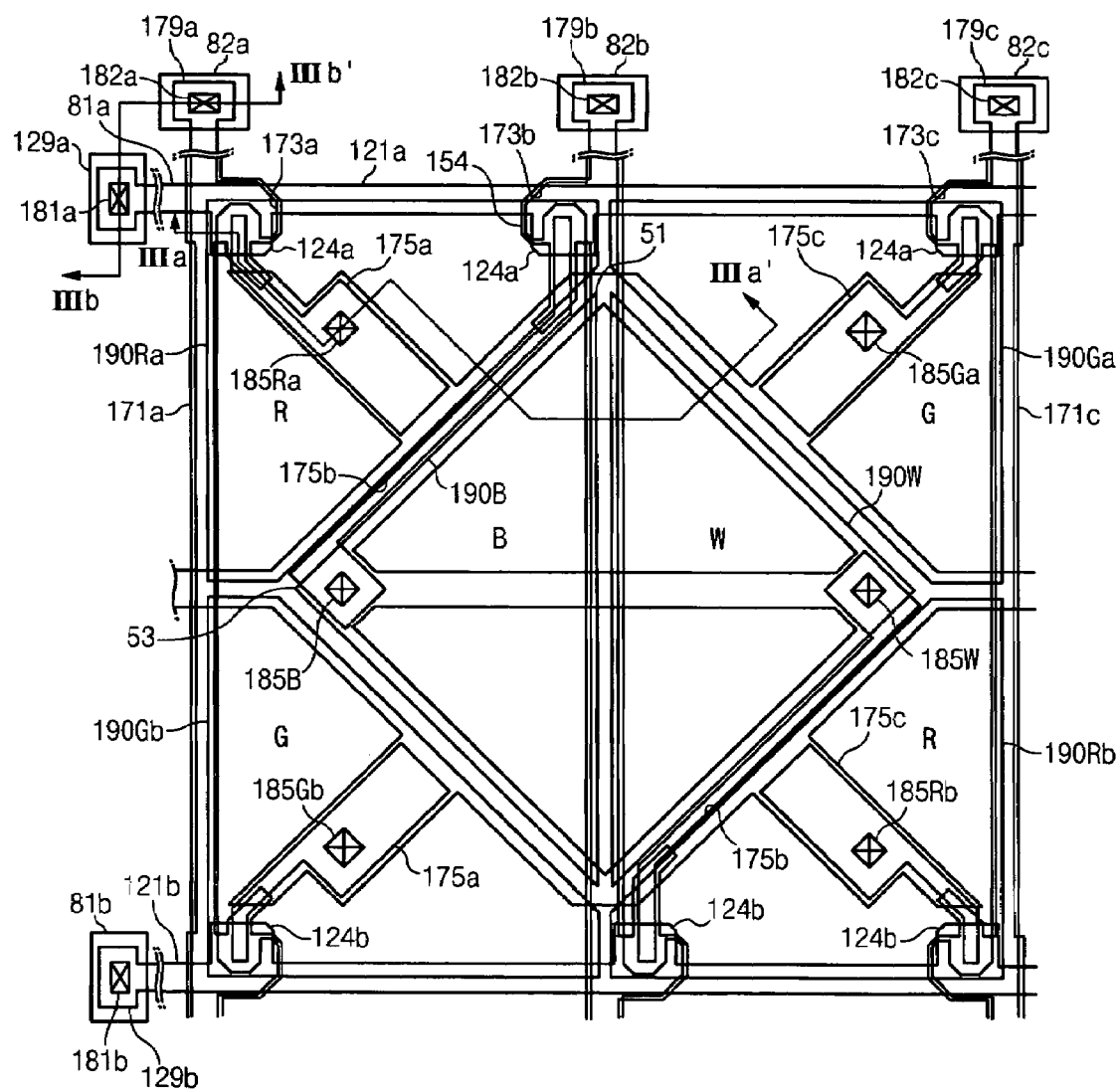
FIG. 2 is a layout view of a thin film transistor array panel for an LCD according to the first exemplary embodiment of the present invention.
Figure 3A:
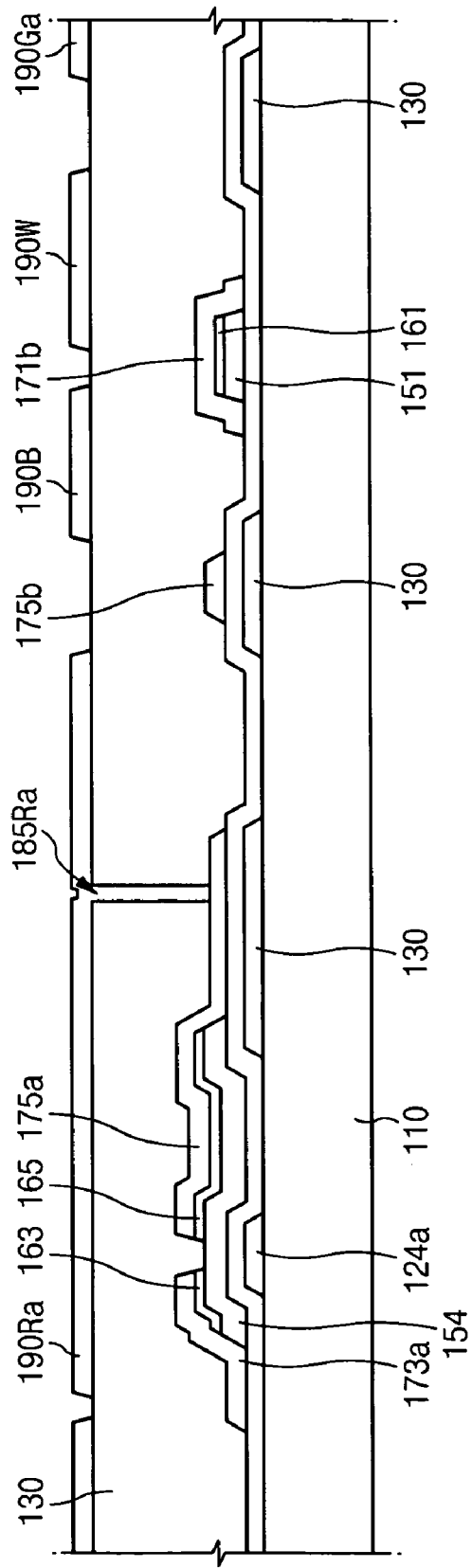
FIGS. 3a and 3b are sectional view of the LCD shown in FIG. 2 respectively taken along the lines IIIa–IIIa' and IIIb–IIIb'.
Figure 3B:
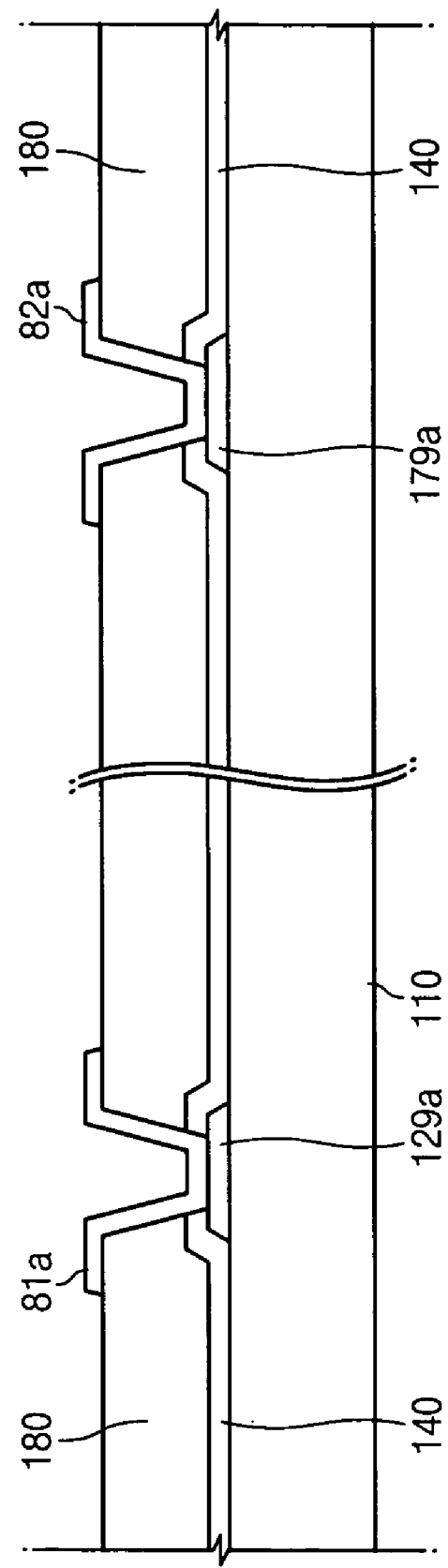

FIG. 1 is a pixel layout of an LCD according to a first exemplary embodiment of the present invention; FIG. 2 is a layout view of a thin film transistor array panel for an LCD according to the first exemplary embodiment of the present invention; and FIGS. 3a and 3b are sectional views of the LCD shown in FIG. 2 respectively taken along the lines IIIa–IIIa' and IIIb–IIIb'.

As shown in FIG. 1, red (R), blue (B), green (G), red (R), blue (B), and green (G) pixels are sequentially aligned along a first column, and green (G), white (W), red (R), green (G), white (W), and red (R) pixels are sequentially aligned along a second column which is adjacent to the first column. Further, red (R) and green (G) pixels are alternately aligned along a first row, and blue (B) and white (W) pixels are aligned along a second row to form lozenges.

Red (R), blue (B), and green (G) pixels aligned along the first column and green (G), white (W), and red (R) pixels aligned along the second column form a dot. Accordingly, a dot includes two red pixels, two green pixels, a blue pixel, and a white pixel.

The triangular blue (B) and white (W) pixels respectively included in the first and second columns have a base in common and form a lozenge which is disposed at the center of the dot.

Two red (R) pixels included in a dot are respectively included in the first and second columns and face each other obliquely, while the lozenge formed of the blue (B) and white (W) pixels is disposed between them. Two green (G) pixels included in the dot are respectively included in the first and second columns and face each other obliquely, while the lozenge formed of the blue (B) and white (W) pixels is disposed between them.

In other words, the base 50 and base vertices 51 and 52 of the triangular blue (B) and white (W) pixels are parallel with a data line, and apexes 53 of the triangular blue (B) and white (W) pixels are disposed on a line parallel with a gate line.

A thin film transistor (TFT) array panel of the LCD according to the first exemplary embodiment of the present invention will be described in more detail with reference to the FIGS. 2 to 3b.

Red pixel electrodes 190Ra and 190Rb, green pixel electrodes 190Ga and 190Gb, a blue pixel electrode 190B, and a white pixel electrode 190W respectively correspond to the red, green, blue, and white pixels and form a dot.

Here, as shown in FIG. 2, two gate lines 121a and 121b are formed in a dot which has a rectangular shape. The first gate line 121a transmits scanning signals for turning on TFTs which switch the first red pixel electrode 190Ra, the first green pixel electrode 190Ga, and the blue pixel electrode 190B. The second gate line 121b transmits scanning signals for turning on TFTs which switch the second red pixel electrode 190Rb, the second green pixel electrode 190Gb, and the white pixel electrode 190W.

Three straight data lines 171a, 171b, and 171c are formed in a dot which has a rectangular shape, and cross the gate lines 121a and 121b. The first data line 171a transmits image signals for the first red pixel electrode 190Ra and the second green pixel electrode 190Gb. The second data line 171b transmits image signals for the blue pixel electrode 190B and the white pixel electrode 190W. The third data line 171c transmits image signals for the second red pixel electrode 190Rb and the first green pixel electrode 190Ga.

Six TFTs are respectively formed near the cross portions. The six TFTs include gate electrodes 124a and 124b respectively connected to the gate lines 121a and 121b, source electrodes 173a, 173b, and 173c respectively connected to the data lines 171a, 171b, and 171c, drain electrodes 175a, 175b, and 175c, and semiconductors 154.

The pixel electrodes 190Ra, 190Rb, 190Ga, 190Gb, 190B, and 190W are respectively formed in each pixels and are respectively connected to the six TFTs.

The blue and white pixel electrodes 190B and 190W are disposed on both sides of the second data line 171b. Therefore, the second data line 171b transmitting image signals for the blue and white pixel electrodes 190B and 190W can be formed as a straight line. Accordingly, resistance of the data line 171b does not increase.

The blue and white pixel electrodes 190B and 190W can be independently driven by forming TFTs for each pixel.

Meanwhile, widths of the expansions 129a and 129b of the gate lines 121a and 121b are expanded for contacting an external circuit and receiving scanning signals, and widths of the expansions 179a, 179b, and 179c of the data lines 171a, 171b, and 171c are expanded for contacting an external circuit and receiving image signals.

A storage electrode line 130 is formed on the same layer with the gate lines 121a and 121b to form a storage capacitance by overlapping with the pixel electrodes 190Ra, 190Rb, 190Ga, 190Gb, 190B, and 190W. The storage electrode line 130 is disposed along pixel boundary lines to overlap boundary portions of the all of the pixel electrode 190Ra, 190Rb, 190Ga, 190Gb, 190B, and 190W.

The storage electrode line 130 is disposed centered between the gate lines 121a and 121b for being shared by all of the pixel electrodes 190Ra, 190Rb, 190Ga, 190Gb, 190B, and 190W. Therefore, the apexes 53 of the triangular blue and white pixel electrodes 190B and 190W are disposed on the storage electrode line 130.

The TFT array panel of the LCD according to the first exemplary embodiment will be described in detail.

A plurality of gate lines 121a and 121b and a plurality of storage electrode lines 130 are formed on an insulating substrate 110. The gate lines 121a and 121b extend substantially in a transverse direction and are separated from each other and transmit scanning signals. The gate lines 121a and 121b have a plurality of gate electrodes 124a and 124b which respectively protrude downward and upward and expansions 129a and 129b for connecting to an external circuit.

The gate lines 121a and 121b and the storage electrode lines 130 may have a multi-layered structure including two films having different physical characteristics, i.e., a lower film (not shown) and an upper film (not shown). The upper film is preferably made of low resistivity metal including an Al-containing metal such as Al and an Al alloy for reducing signal delay or voltage drop in the gate lines 121a and 121b and the storage electrode lines 130. On the other hand, the lower film is preferably made of a material such as Cr, Mo, or a Mo alloy (for example MoW), which have good contact characteristics with other materials such as indium tin oxide (ITO) and indium zinc oxide (IZO). Good exemplary combinations of the lower film material and the upper film material are Cr/Al and Cr/Al—Nd alloy.

In addition, the lateral sides of the gate lines 121a and 121b and the storage electrode lines 131 are tapered, and the inclination angle of the lateral sides with respect to a surface of the substrate 110 ranges about 30–80 degrees.

The storage electrode line 130 overlaps with portions of the pixel electrodes 190Ra, 190Rb, 190Ga, 190Gb, 190B, and 190W to form storage capacitance for enhancing charge possession ability of pixels.

A gate insulating layer 140 preferably made of silicon nitride (SiNx) is formed on the gate lines 121a and 121b and the storage electrode lines 131.

A plurality of semiconductor stripes 151 preferably made of hydrogenated amorphous silicon (abbreviated to "a-Si") are formed on the gate insulating layer 140. Each semiconductor stripe 151 extends substantially in the longitudinal direction and has a plurality of projections 154 branched out toward the gate electrodes 124a and 124b.

A plurality of ohmic contact stripes and islands 161 and 165 preferably made of silicide or n+hydrogenated a-Si heavily doped with n-type impurities are formed on the semiconductor stripes 151. Each ohmic contact stripe 161 has a plurality of projections 163, and the projections 163 and the ohmic contact islands 165 are located in pairs on the projections 154 of the semiconductor stripes 151.

The edge surfaces of the semiconductor stripes 151 and the ohmic contacts 161 and 165 are tapered, and the inclination angles of the edge surfaces of the semiconductor stripes 151 and the ohmic contacts 161 and 165 are preferably in a range of about 30–80 degrees.

A plurality of data lines 171a, 171b, and 171c made of a material having low resistivity are formed on the ohmic contacts 161 and 165 and the gate insulating layer 140.

The data lines 171a, 171b, and 171c for transmitting image signals extend substantially in the longitudinal direction and intersect the gate lines 121a and 121b. A plurality of branches of each data line 171a, 171b, and 171c, which project toward the drain electrodes 175a, 175b, and 175c, form a plurality of source electrodes 173a, 173b, and 173c. Each pair of the source electrodes 173a, 173b, and 173c and the drain electrodes 175a, 175b, and 175c is separated from each other and opposite of each other with respect to a gate electrode 124a and 124b. The gate electrodes 124a, 124b, and 124c, the source electrodes 173a, 173b, and 173c, and the drain electrodes 175a, 175b, and 175c along with a projection 154 of a semiconductor stripe 151 forms a TFT having a channel formed in the projection 154 disposed between the source electrodes 173a, 173b, and 173c and the drain electrodes 175a, 175b, and 175c.

The data line 171a, 171b, and 171c respectively include expansions 179a, 179b, and 179c having a wider width for contact with another layer or an external device.

The data lines 171a, 171b, and 171c and the drain electrodes 175a, 175b, and 175c may have a multi-layered structure including two films having different physical characteristics, i.e., a lower film (not shown) and an upper film (not shown). The upper film is preferably made of a low resistivity metal including an Al-containing metal such as Al or an Al alloy for reducing signal delay or voltage drop in the data lines. On the other hand, the lower film is preferably made of a material such as Cr, Mo, or a Mo alloy, which has good contact characteristics with other materials such as indium tin oxide (ITO) and indium zinc oxide (IZO). Good exemplary combinations of the lower film material and the upper film material are Cr/Al and Cr/Al—Nd alloy.

In addition, the lateral sides of the data lines 171a, 171b, and 171c and the drain electrodes 175a, 175b, and 175c are tapered, and the inclination angle of the lateral sides with respect to a surface of the substrate 110 ranges about 30–80 degrees.

The ohmic contacts 161 and 165 exist only between the semiconductor 151 and the data lines 171a, 171b, and 171c and the drain electrodes 175a, 175b, and 175c and have a function of lowering the contact resistance between the underlying semiconductor 151 and the overlying data lines 171a, 171b, and 171c and drain electrodes 175a, 175b, and 175c. The semiconductor stripes 151 have substantially the same planar shape as the ohmic contacts 161 and 165, except for the projections 154 where TFTs are provided.

A passivation layer 180 is formed on the data lines 171a, 171b, and 171c and the drain electrodes 175a, 175b, and 175c. The passivation layer 180 is preferably made of a flat photosensitive organic material and a low dielectric insulating material having a dielectric constant under 4.0 such as a-Si:C:O and a-Si:O:F formed by plasma enhanced chemical vapor deposition (PECVD), or an inorganic material such as silicon nitride and silicon oxide.

The passivation layer 180 has a plurality of contact holes 182a, 182b, 182c, 185Ra, 185Ga, 185B, 185Rb, 185Gb, and 185W exposing the drain electrodes 175a, 175b, and 175c and the expansions 179a, 179b, and 179c of the data lines 171a, 171b, and 171c, respectively. The passivation layer 180 and the gate insulating layer 140 have a plurality of contact holes 181a and 181b exposing the expansions 129a and 129b of the gate lines 121a and 121b.

The contact holes 181a, 181b, 182a, and 182b expose the expansions 129a, 129b, 179a, 179b, and 179c. The contact holes 185Ra, 185Ga, 185B, 185Rb, 185Gb, and 185W expose portions of the drain electrode 175a, 175b, and 175c. Here, the contact holes 185Ra, 185B, and 185Ga respectively expose the drain electrodes 175a, 175b, and 175c which are respectively connected to the first red pixel electrode 190Ra, blue pixel electrode 190B, and first green pixel electrode 190Ga, and the contact holes 185Gb, 185W, and 185Rb respectively expose the drain electrodes 175a, 175b, and 175c which are respectively connected to the second green pixel electrode 190Gb, white pixel electrode 190W, and second red pixel electrode 190Rb.

A plurality of pixel electrodes 190Ra, 190Rb, 190Ga, 190Gb, 190B, and 190W and a plurality of contact assistants 81a, 81b, 82a, and 82b, which are preferably made of transparent conductive material such as ITO or IZO, are formed on the passivation layer 180.

The pixel electrodes 190Ra, 190Rb, 190Ga, 190Gb, 190B, and 190W have shapes to conform to their pixel boundaries.

The pixel electrodes 190Ra, 190Rb, 190Ga, 190Gb, 190B, and 190W are physically and electrically connected to the drain electrodes 175a, 175b, and 175c through the contact holes 185Ra, 185Ga, 185B, 185Rb, 185Gb, and 185W and receive data voltages from the drain electrodes 175a, 175b, and 175c. The pixel electrodes 190Ra, 190Rb, 190Ga, 190Gb, 190B, and 190W receive data voltages to produce electric fields along with a common electrode (not illustrated) formed on the other substrate (not illustrated) and receiving common voltage. The electric fields formed between the pixel electrodes 190Ra, 190Rb, 190Ga, 190Gb, 190B, and 190W and the common electrode rearrange liquid crystal molecules therebetween.

The pixel electrodes 190Ra, 190Rb, 190Ga, 190Gb, 190B, and 190W and the common electrode make capacitors (to be called "liquid crystal capacitors") to sustain voltages between them after the TFTs being turned off. Storage capacitors are connected to the liquid crystal capacitors in parallel to enhance ability of sustaining voltage. The storage capacitors are made by overlapping of the pixel electrodes 190Ra, 190Rb, 190Ga, 190Gb, 190B, and 190W and previous gate lines 121a and 121b or storage electrode lines formed separately.

The storage electrode line 130 is formed on the same layer as the gate lines 121*a* and 121*b* and is applied with a separate voltage such as the common voltage. Conductors which are overlapped with the previous gate line or the storage electrode line may be formed under the passivation layer 180 to increase storage capacitance.

A portion of the drain electrode 175*b* connected to the blue pixel electrode 190B is elongated along the boundary of the blue pixel electrode 190B and the first red pixel electrode 190Ra. The end part of the elongated portion of the drain electrode 175*b* is connected to the blue pixel electrode 190B through the contact hole 185B. The contact hole 185B is disposed on the storage electrode line 130 to prevent reduction of aperture ratio.

The end part of the drain electrode 175*b* connected to the blue pixel electrode 190B is overlapped with the storage electrode line 130. Since the drain electrode 175*b* is nearer than the blue pixel electrode 190B to the storage electrode line 130, the storage capacitance (Cstb) between the storage electrode line 130 and the blue pixel electrode 190B is increased due to the drain electrode 175*b*. Furthermore, the aperture ratio is also increased due to the overlapping of the storage electrode line 130 and the drain electrode 175*b*.

Similarly, a portion of the drain electrode 175*b* connected to the white pixel electrode 190W is elongated along the boundary of the white pixel electrode 190W and the second red pixel electrode 190Rb. The end part of the elongated portion of the drain electrode 175*b* is connected to the white pixel electrode 190W through the contact hole 185W. The contact hole 185W is disposed on the storage electrode line 130 to prevent reduction of aperture ratio.

The end part of the drain electrode 175*b* connected to the white pixel electrode 190W is overlapped with the storage electrode line 130. Since the drain electrode 175*b* is nearer than the white pixel electrode 190W to the storage electrode line 130, the storage capacitance between the storage electrode line 130 and the white pixel electrode 190W is increased due to the drain electrode 175*b*. Furthermore, the aperture ratio is also increased due to the overlapping of the storage electrode line 130 and the drain electrode 175*b*.

The storage electrode line 130 is disposed along the boundary of the blue pixel electrode 190B and the second green pixel electrode 190Gb and the boundary of the white pixel electrode 190W and the first green pixel electrode 190Ga to make storage capacitances.

The storage electrode line 130 disposed along the boundary of the first red pixel electrode 190Ra and the blue pixel electrode 190B, the second red pixel electrode 190Rb and the white pixel electrode 190W, the blue pixel electrode 190B and the second green pixel electrode 190Gb, and the white pixel electrode 190W and the first green pixel electrode 190Ga plays a role of a light blocking layer to block the light of the back light.

It is preferable for an LCD having the above-described pixel structure to use a rendering method for improving resolution. One of the rendering methods is as follows. When a specific pixel needs to have a gray voltage which is not available to display a specific image, predetermined gray voltages are applied to the adjacent pixels along with the specific pixel to display the specific image.

Henceforth, Clcr means the capacitance of the liquid crystal capacitor made between the red pixel electrodes 190Ra and 190Rb and the common electrode; Cstr means the capacitance of the storage capacitor made between the red pixel electrodes 190Ra and 190Rb and the storage electrode line 130; Clcg means the capacitance of the liquid crystal capacitor made between the green pixel electrodes 190Ga and 190Gb and the common electrode; Cstg means the capacitance of the storage capacitor made between the green pixel electrodes 190Ga and 190Gb and the storage electrode line 130; Clcb means the capacitance of the liquid crystal capacitor made between the blue pixel electrode 190B and the common electrode; Cstb means the capacitance of the storage capacitor made between the blue pixel electrode 190B and the storage electrode line 130; Clcw means the capacitance of the liquid crystal capacitor made between the white pixel electrode 190W and the common electrode; and Cstw means the capacitance of the storage capacitor made between the white pixel electrode 190W and the storage electrode line 130.

The LCD according to the first exemplary embodiment of the present invention has a P2 type of RGBW pixel structure. Accordingly, the red pixel electrodes 190Ra and 190Rb and the green pixel electrodes 190Ga and 190Gb have the same area, and the blue pixel electrode 190B and the white pixel electrode 190W have the same area. The sum of areas of the red and green pixel electrodes 190Ra, 190Rb, 190Ga, and 190Gb is twice that of the sum of areas of the blue and white pixel electrodes 190B and 190W.

Therefore, $$Clcr + Clcg : Clcb + Clcw = 2 : 1.$$

Total capacitance of a pixel is composed of the liquid crystal capacitance and the storage capacitance. Therefore, when the liquid crystal capacitance is different, the total capacitance of a pixel is also different. Meanwhile, a difference of capacitance among pixels in an LCD causes variation of kick-back voltage among pixels and results in display defects such as flicker.

The kick-back voltage is described by the following Equation 1. In Equation 1, Vkb, Clc, Cst, Cgd, and Vg respectively represent the kick-back voltage, the liquid crystal capacitance formed between the pixel electrode and common electrode, the storage capacitance formed between the storage electrode line and pixel electrode, the parasitic capacitance formed between the gate and drain electrodes, and the gate line voltage.

$$Vkb = \{Cgd/(Cgd+Clc+Cst)\}\Delta Vg \quad \text{[Equation 1]}$$

Equation 1 says that when Clc is different among pixels, Vkb is also different. This means that there is kick-back voltage variation among pixels.

According to Equation 1, the storage capacitance can be adjusted to make total capacitance of pixels equal and to result in preventing a variation of kick-back voltage. That is, the storage capacitance is adjusted to make the capacitance sums of Clcr and Cstr, Clcg and Cstg, Clcb and Cstb, and Clcw and Cstw equal. To adjust the storage capacitance, the overlapping area of the storage electrode lines 130 and the pixel electrodes is increased.

When Clcr (or Clcg) is larger than the Clcb (or Clcw) due to the area of the red pixel electrodes 190Ra and 190Rb (or the green pixel electrodes 190Ga and 190Gb) being larger than the area of the blue pixel electrode 190B (or the white pixel electrode 190W), the storage electrode line 130 is modified in order for the overlapping area of the red pixel electrodes 190Ra and 190Rb (or the green pixel electrodes 190Ga and 190Gb) and the storage electrode line 130 to be smaller than that of the blue pixel electrode 190B (or the white pixel electrode 190W) and the storage electrode line 130.

In the LCD according to the first exemplary embodiment of the present invention, the red pixel electrodes 190Ra and 190Rb and the green pixel electrodes 190Ga and 190Gb have the same area. The blue pixel electrode 190B and the white pixel electrode 190W have the same area. The sum of areas of the red and green pixel electrodes 190Ra, 190Rb, 190Ga, and 190Gb is twice that of the sum of areas of the blue and white pixel electrodes 190B and 190W. Therefore, Clcr+Clcg:Clcb+Clcw=2:1.

The equation Clcr (or Clcg)+Cstr (or Cstg)=Clcb (or Clcw)+Cstb (or Cstw) needs to be satisfied for preventing variation of kick-back voltage. Therefore, Cstb (or Cstw) is adjusted to be twice the size of Cstr (or Cstg) for complementing deficiency of the liquid crystal capacitance.

Since the liquid crystal capacitance Clcr, Clcg, Clcb, and Clcw depend on the pixel voltage, the total capacitance of pixels varies according to the gray voltage. This means that variation of the total capacitance among pixels can be induced by their gray voltage.

That is, variation of the liquid crystal capacitance of red pixels, ΔClcr (or green pixels, ΔClcg) is larger than that of the blue pixel, ΔClcb (or white pixel, ΔClcw). Therefore, the total capacitance of the red pixel electrodes 190Ra and 190Rb, Clcr+Cstr (or the green pixel electrodes 190Ga and 190Gb, Clcg+Cstg), can be different from that of the blue pixel electrode 190B, Clcb+Cstb (or the white pixel electrode 190W, Clcw+Cstw). Such a total capacitance difference induces variation of Vkb. To reduce dependency of the total capacitance about the gray voltage, the storage capacitance Cstr, Cstg, Cstb, and Cstw are preferably formed to have larger values.

Accordingly, in the second exemplary embodiment of the present invention, Cstr and Cstg are adjusted to be twice as large and the Cstb and Cstw are adjusted to be one and one half times as large as those of the first exemplary embodiment. Such adjustments are done by adjusting overlapping area of the storage electrode line and the pixel electrode.

When the ratio of Clcr (or Clcg) and Clcb (or Clcw) is a:b and the ratio of Cstr (or Cstg) and Cstb (or Cstw) is c:b, the storage capacitances Cstr, Cstg, Cstb, and Cstw are increased to satisfy equations a+c=b+d and 1/2<c/d<1.

Now, the above-described effect will be concretely described using specific values with reference to FIGS. 4a to 5b.

Figure 4A:
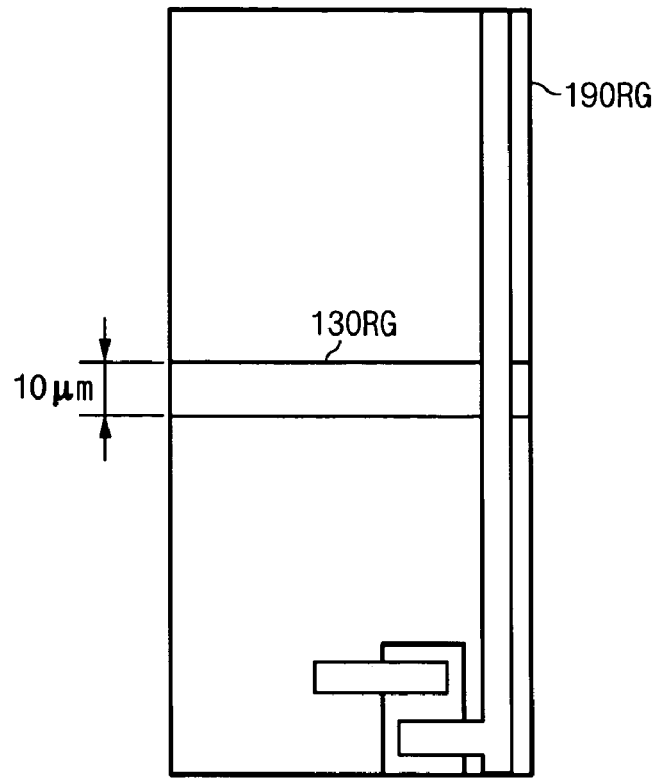
FIG. 4a is a schematic view of a red or green pixel of a conventional LCD.
Figure 4B:
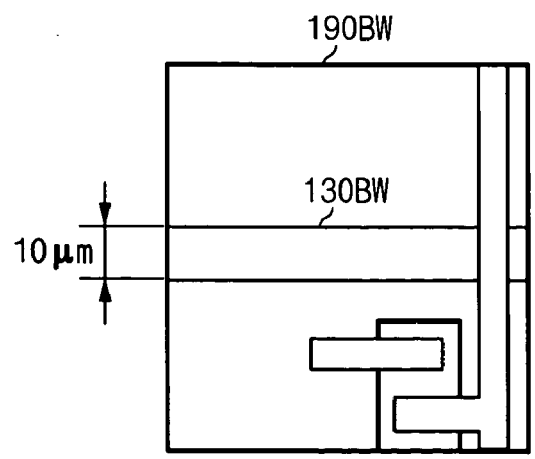
FIG. 4b is a schematic view of a blue or white pixel of a conventional LCD.

FIG. 4a is a schematic view of a red or green pixel of a conventional LCD and FIG. 4b is a schematic view of a blue or white pixel of a conventional LCD.

In FIG. 4a, Clcr (or Clcg) ranges from 1.9 to 2.1, Cstr (or Cstg) is 1, Cgdr (or Cgdg) is 0.1, and the width of the portion of the storage electrode line 130RG overlapping the pixel electrode 190RG is 110 μm. Here, units of Clcr (or Clcg), Cstr (or Cstg), and Cgdr (or Cgdg) are omitted because their ratio is the only factor of concern.

In FIG. 4b, Clcb (or Clcw) ranges from 0.9 to 1.1, Cstb (or Cstw) is 1, Cgdb (or Cgdw) is 0.1, and the width of the portion of the storage electrode line 130RW overlapping the pixel electrode 190RW is 10 μm. Here, units of Clcb (or Clcw), Cstb (or Cstw), and Cgdb (or Cgdw) are omitted because their ratio is the only factor of concern.

In FIGS. 4a and 4b, the area ratio of the red pixel electrode (or the green pixel electrode) versus the blue pixel electrode (or the white pixel electrode) is 2:1. Accordingly, Clcr (or Clcg): Clcb (or Clcw)=2:1.

In this condition, when a mid gray voltage, 20V, is applied, kick-back voltage of the red pixel or the green pixel is calculated according to Equation 1 as follows.

$$Vkbr \text{ (or } Vkbg) = (0.1 * 20)/(0.1 + 1 + 2)$$
$$= 0.645$$

In this condition, when a mid gray voltage, 20V, is applied, kick-back voltage of the blue pixel or the white pixel is calculated according to Equation 1 as follows.

$$Vkbb \text{ (or } Vkbw) = (0.1 * 20)/(0.1 + 1 + 1)$$
$$= 0.952$$

Accordingly, variation of kick-back voltage ΔVkb between the red pixel (or the green pixel) and the blue pixel (or the white pixel) reaches 0.307. Such a large value of ΔVkb induces display defects such as flicker.

When the liquid crystal capacitances Clcr, Clcg, Clcb, and Clcw are increased by 10% due to transition of gray voltage, kick-back voltage of the red pixel or the green pixel is calculated according to Equation 1 as follows.

$$Vkb \text{ (or } Vkbg) = (0.1 * 20)/(0.1 + 1 + 2.2)$$
$$= 0.606$$

In this condition, kick-back voltage of the blue pixel or the white pixel is calculated according to Equation 1 as follows.

$$Vkbb \text{ (or } Vkbw) = (0.1 * 20)/(0.1 + 1 + 1.1)$$
$$= 0.909$$

Accordingly, variation of kick-back voltage ΔVkb between the red pixel (or the green pixel) and the blue pixel (or the white pixel) reaches 0.303. Such a large value of ΔVkb induces display defects such as flicker.

The LCD illustrated in FIGS. 4a and 4b has display defects such as flicker due to variation of kick-back voltage between the red pixel (or the green pixel) and the blue pixel (or the white pixel). However, an LCD illustrated in FIGS. 5a and 5b does not have such display defects because the total capacitance of each pixel is made to be equal by increasing storage capacitance.

Figure 5A:
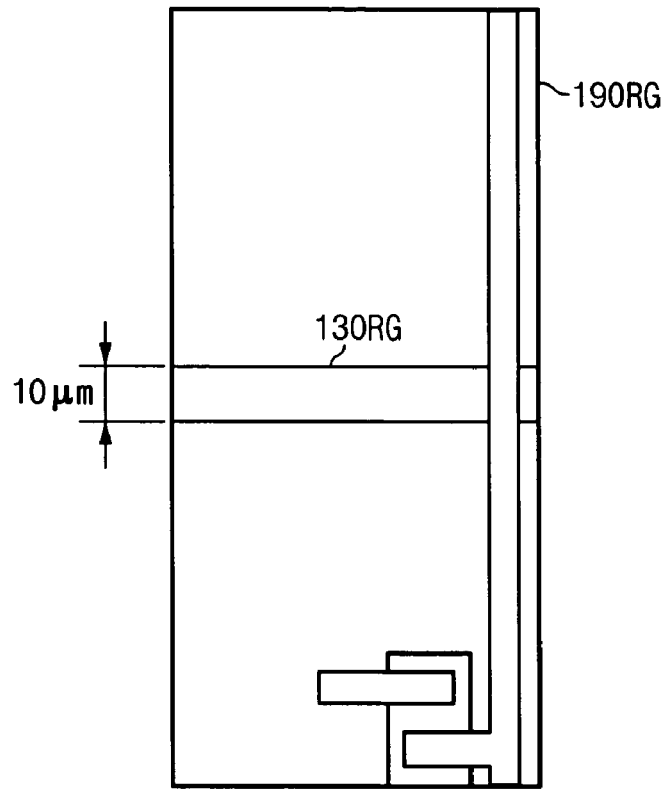
FIG. 5a is a schematic view of a red or green pixel of an LCD according to the first exemplary embodiment of the present invention.
Figure 5B:
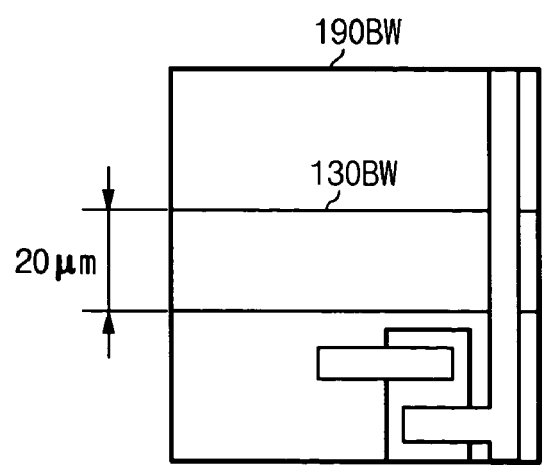
FIG. 5b is a schematic view of a blue or white pixel of an LCD according to the first exemplary embodiment of the present invention.

FIG. 5a is a schematic view of a red or green pixel of an LCD according to the first exemplary embodiment of the present invention, and FIG. 5b is a schematic view of a blue or white pixel of an LCD according to the first exemplary embodiment of the present invention.

In FIG. 5a, Clcr (or Clcg) ranges from 1.9 to 2.1, Cstr (or Cstg) is 1, Cgdr (or Cgdg) is 0.1, and the width of the portion of the storage electrode line 130RG overlapping the pixel electrode 190RG is 10 μm.

In FIG. 5b, Clcb (or Clcw) ranges from 0.9 to 1.1, Cstb (or Cstw) is 2, Cgdb (or Cgdw) is 0.1, and the width of the portion of the storage electrode line 130RW overlapping the pixel electrode 190RW is 20 μm.

In FIGS. 5a and 5b, the area ratio of the red pixel electrode (or the green pixel electrode) versus the blue pixel electrode (or the white pixel electrode) is 2:1. Accordingly, Clcr (or Clcg): Clcb (or Clcw)=2:1.

In this condition, when a mid gray voltage, 20V, is applied, kick-back voltage of the red pixel or the green pixel is calculated according to Equation 1 as follows.

$$Vkbr \text{ (or } Vkbg) = (0.1*20)/(0.1+1+2)$$
$$= 0.645$$

In this condition, when a mid gray voltage, 20V, is applied, kick-back voltage of the blue pixel or the white pixel is calculated according to Equation 1 as follows.

$$Vkbb \text{ (or } Vkbw) = (0.1*20)/(0.1+2+1)$$
$$= 0.645$$

Accordingly, variation of kick-back voltage $\Delta Vkb$ between the red pixel (or the green pixel) and the blue pixel (or the white pixel) is 0. Therefore, there is no flicker.

When the liquid crystal capacitances Clcr, Clcg, Clcb, and Clcw are increased by 10% due to transition of gray voltage, kick-back voltage of the red pixel or the green pixel is calculated according to Equation 1 as follows.

$$Vkb \text{ (or } Vkbg) = (0.1*20)/(0.1+1+2.2)$$
$$= 0.606$$

In this condition, kick-back voltage of the blue pixel or the white pixel is calculated according to Equation 1 as follows.

$$Vkbb \text{ (or } Vkbw) = (0.1*20)/(0.1+2+1.1)$$
$$= 0.625$$

Accordingly, variation of kick-back voltage $\Delta Vkb$ between the red pixel (or the green pixel) and the blue pixel (or the white pixel) reaches 0.019. Even though the value of $\Delta Vkb$ is small, it induces display defects such as flicker.

Figure 6A:
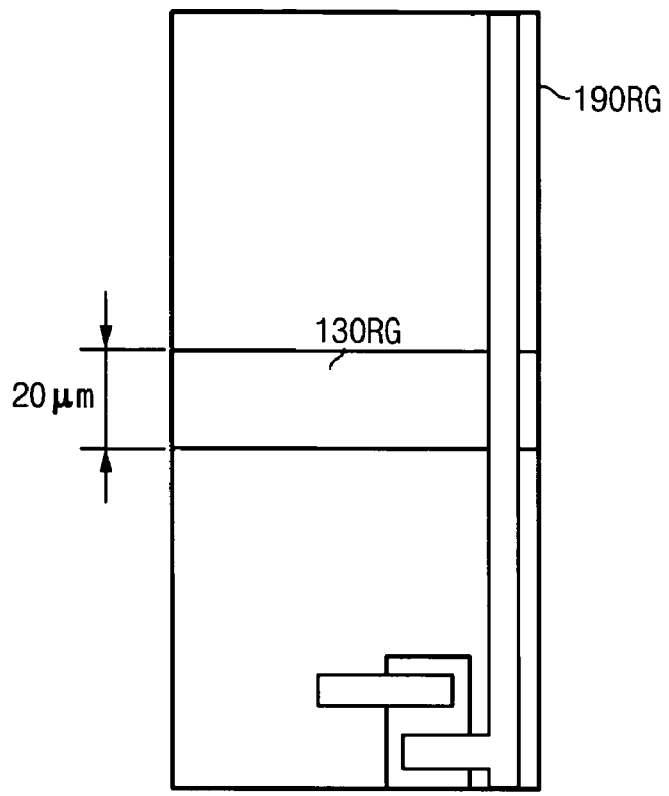
FIG. 6a is a schematic view of a red or green pixel of an LCD according to a second exemplary embodiment of the present invention.
Figure 6B:
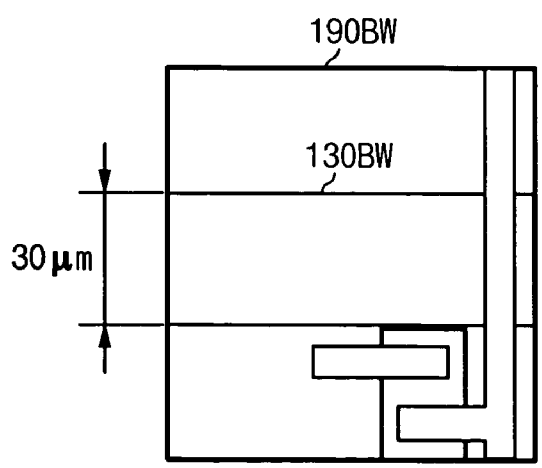
FIG. 6b is a schematic view of a blue or white pixel of an LCD according to a second exemplary embodiment of the present invention.

An LCD illustrated in FIGS. 6a and 6b does not have such display defects regardless of gray voltage transition because the total capacitance of each pixel is modified to be equal and the storage capacitances of the red, green, blue, and white pixels are increased.

FIG. 6a is a schematic view of a red or green pixel of an LCD according to a second exemplary embodiment of the present invention, and FIG. 6b is a schematic view of a blue or white pixel of an LCD according to a second exemplary embodiment of the present invention.

In FIG. 6a, Clcr (or Clcg) ranges from 1.9 to 2.1, Cstr (or Cstg) is 2, Cgdr (or Cgdg) is 0.1, and the width of the portion of the storage electrode line 130RG overlapping the pixel electrode 190RG is 20 μm.

In FIG. 6b, Clcb (or Clcw) ranges from 0.9 to 1.1, Cstb (or Cstw) is 3, Cgdb (or Cgdw) is 0.1, and the width of the portion of the storage electrode line 130RW overlapping the pixel electrode 190RW is 30 μm.

In FIGS. 6a and 6b, the area ratio of the red pixel electrode (or the green pixel electrode) versus the blue pixel electrode (or the white pixel electrode) is 2:1. Accordingly, Clcr (or Clcg): Clcb (or Clcw)=2:1.

In this condition, when a mid gray voltage, 20V, is applied, kick-back voltage of the red pixel or the green pixel is calculated according to Equation 1 as follows.

$$Vkbr \text{ (or } Vkbg) = (0.1*20)/(0.1+2+2)$$
$$= 0.488$$

In this condition, when a mid gray voltage, 20V, is applied, kick-back voltage of the blue pixel or the white pixel is calculated according to Equation 1 as follows.

$$Vkbb \text{ (or } Vkbw) = (0.1*20)/(0.1+3+1)$$
$$= 0.488$$

Accordingly, variation of kick-back voltage $\Delta Vkb$ between the red pixel (or the green pixel) and the blue pixel (or the white pixel) is 0. Therefore, there is no flicker.

When the liquid crystal capacitances Clcr, Clcg, Clcb, and Clcw are increased by 10% due to transition of gray voltage, kick-back voltage of the red pixel or the green pixel is calculated according to Equation 1 as follows.

$$Vkb \text{ (or } Vkbg) = (0.1*20)/(0.1+2+2.2)$$
$$= 0.465$$

In this condition, kick-back voltage of the blue pixel or the white pixel is calculated according to Equation 1 as follows.

$$Vkbb \text{ (or } Vkbw) = (0.1*20)/(0.1+3+1.1)$$
$$= 0.476$$

Accordingly, variation of kick-back voltage $\Delta Vkb$ between the red pixel (or the green pixel) and the blue pixel (or the white pixel) only reaches 0.011. Such a value of $\Delta Vkb$ is small enough that display defects such as flicker induced by $\Delta Vkb$ can be ignored.

One can adjust the parasitic capacitance formed between the gate electrode 124 and the drain electrode 175 to prevent variation of kick-back voltage. Such a method will be described as third and fourth exemplary embodiments.

Figure 7A:
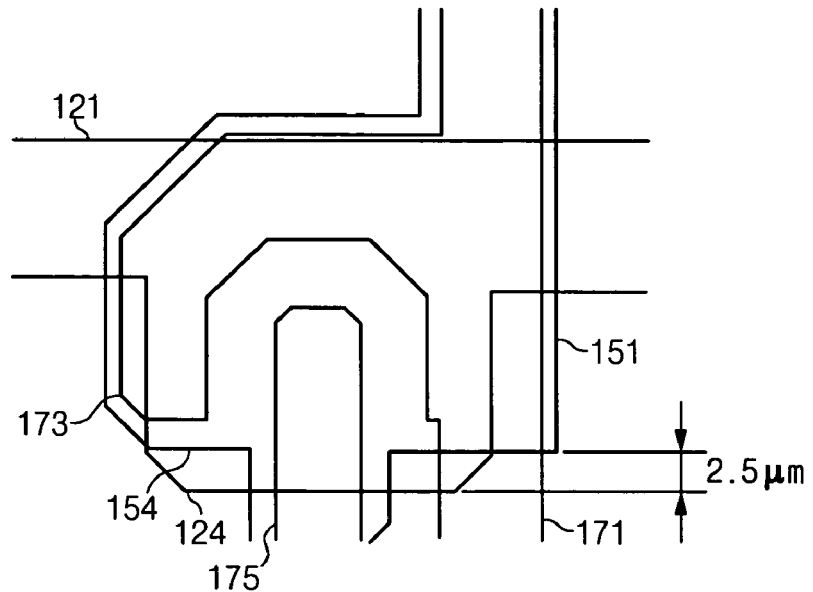
FIG. 7a is an enlarged view of a thin film transistor of an LCD according to a third exemplary embodiment, wherein the thin film transistor is disposed in a red or green pixel.
Figure 7B:
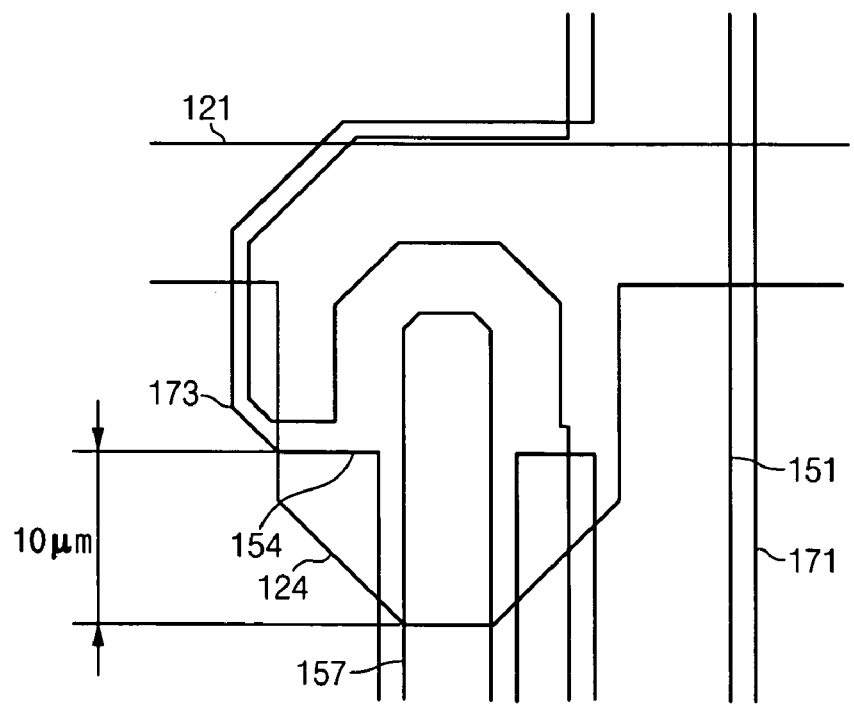
FIG. 7b is an enlarged view of a thin film transistor of an LCD according to a third exemplary embodiment, wherein the thin film transistor is disposed in a blue or white pixel.

FIG. 7a is an enlarged view of a thin film transistor of an LCD according to a third exemplary embodiment, wherein the thin film transistor is disposed in a red or green pixel, and FIG. 7b is an enlarged view of a thin film transistor of an LCD according to a third exemplary embodiment, wherein the thin film transistor is disposed in a blue or white pixel.

In the third exemplary embodiment of the present invention, Cgdr (or Cgdg) is increased to be larger than Cgdb (or Cgdw) to make the kick-back voltage Vkb of pixels equal. To adjust the parasitic capacitance, the overlapping area of a gate electrode 124 and a drain electrode 175 of a red pixel (or a green pixel) is increased.

As shown in FIG. 7a, the gate electrode 124 is expanded over the channel area to 2.5 μm to prevent photo leakage current due to back light.

The length of the expanded portion of the gate electrode 124 is 2.5 μm in the blue or white pixels. However, as shown in FIG. 7b, the length of the expanded portion of the gate electrode 124 is enlarged to reach 10 μm. Accordingly, the overlapping area of the gate electrode 124 and the drain electrode 175 in the red pixel (or the green pixel) is larger than that of the blue pixel (or the white pixel). Therefore, parasitic capacitance of the red pixel Cgdr (or the green pixel Cgdg) is larger than that of the blue pixel (or the white pixel). Such a difference of parasitic capacitance results in equality of kick-back voltage Vkb to prevent the flicker.

Figure 8A:
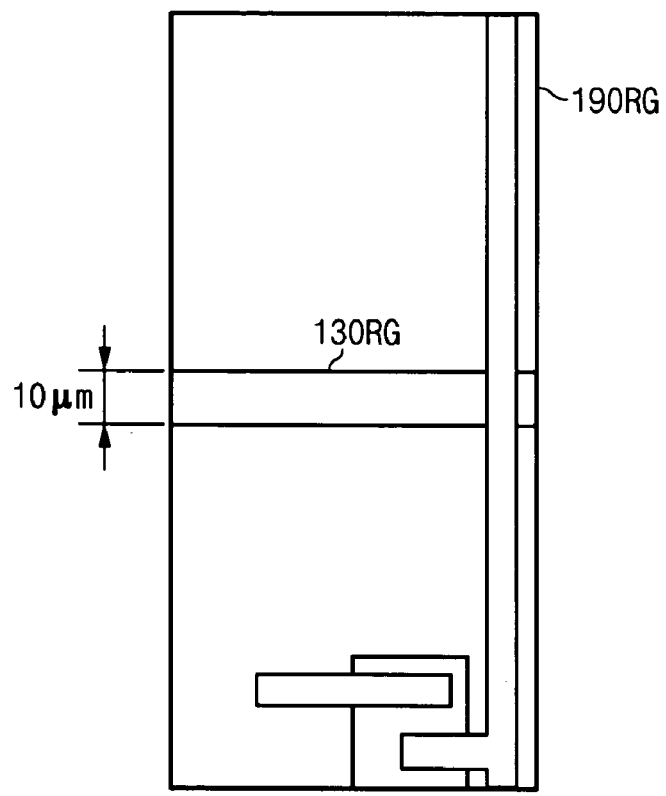
FIG. 8a is a schematic view of a red or green pixel of an LCD according to a third exemplary embodiment of the present invention.
Figure 8B:
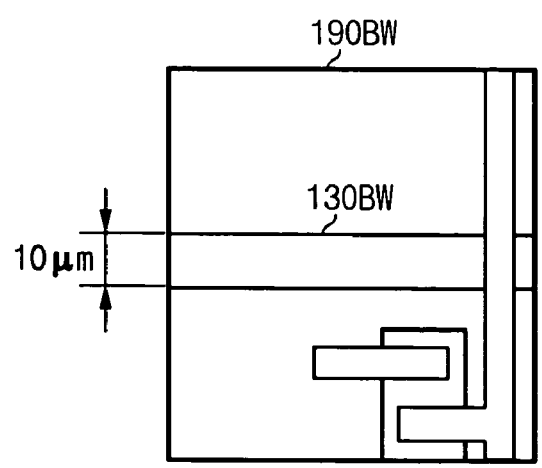
FIG. 8b is a schematic view of a blue or white pixel of an LCD according to a third exemplary embodiment of the present invention.

Now, the above-described effect will be concretely described using specific values with reference to FIGS. 8a and 8b.

FIG. 8a is a schematic view of a red or green pixel of an LCD according to a third exemplary embodiment of the present invention, and FIG. 8b is a schematic view of a blue or white pixel of an LCD according to a third exemplary embodiment of the present invention.

In FIG. 8a, Clcr (or Clcg) ranges from 1.9 to 2.1, Cstr (or Cstg) is 1, Cgdr (or Cgdg) is 0.15, and the width of the portion of the storage electrode line 130RG overlapping the pixel electrode 190RG is 10 μm.

In FIG. 8b, Clcb (or Clcw) ranges from 0.9 to 1.1, Cstb (or Cstw) is 1, Cgdb (or Cgdw) is 0.1, and the width of the portion of the storage electrode line 130RW overlapping the pixel electrode 190RW is 10 μm.

In FIGS. 8a and 8b, the area ratio of the red pixel electrode (or the green pixel electrode) versus the blue pixel electrode (or the white pixel electrode) is 2:1. Accordingly, Clcr (or Clcg): Clcb (or Clcw)=2:1.

In this condition, when a mid gray voltage, 20V, is applied, kick-back voltage of the red pixel or the green pixel is calculated according to Equation 1 as follows.

$$Vkbr \text{ (or } Vkbg) = (0.15*20)/(0.15+1+2)$$

$$= 0.952$$

In this condition, when a mid gray voltage, 20V, is applied, kick-back voltage of the blue pixel or the white pixel is calculated according to Equation 1 as follows.

$$Vkbb \text{ (or } Vkbw) = (0.1*20)/(0.1+1+1)$$

$$= 0.952$$

Accordingly, variation of kick-back voltage ΔVkb between the red pixel (or the green pixel) and the blue pixel (or the white pixel) is 0. Therefore, there is no flicker.

When the liquid crystal capacitances Clcr, Clcg, Clcb, and Clcw are increased by 10% due to transition of gray voltage, kick-back voltage of the red pixel or the green pixel is calculated according to Equation 1 as follows.

$$Vkb \text{ (or } Vkbg) = (0.15*20)/(0.15+1+2.2)$$

$$= 0.896$$

In this condition, when a mid gray voltage, 20V, is applied, kick-back voltage of the blue pixel or the white pixel is calculated according to Equation 1 as follows.

$$Vkbb \text{ (or } Vkbw) = (0.1*20)/(0.1+1+1.1)$$

$$= 0.909$$

Accordingly, variation of kick-back voltage ΔVkb between the red pixel (or the green pixel) and the blue pixel (or the white pixel) reaches 0.013. Even though the value of ΔVkb is small, it induces display defects such as a flicker.

Figure 9A:
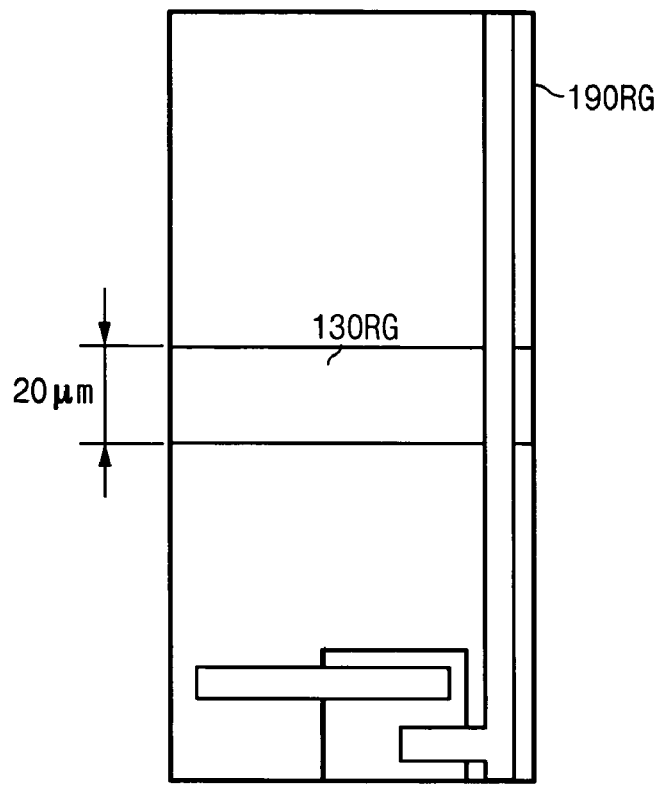
FIG. 9a is a schematic view of a red or green pixel of an LCD according to a fourth exemplary embodiment of the present invention.
Figure 9B:
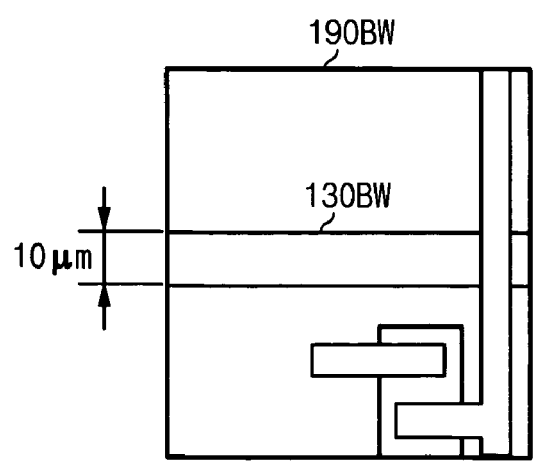
FIG. 9b is a schematic view of a blue or white pixel of an LCD according to a fourth exemplary embodiment of the present invention.

An LCD illustrated in FIGS. 9a and 9b does not have such display defects regardless of gray voltage transition because the ratio of liquid crystal capacitance, storage capacitance, and parasitic capacitance between the red pixel (or the green pixel) and the blue pixel (or the white pixel) is modified to be equal.

FIG. 9a is a schematic view of a red or green pixel of an LCD according to a fourth exemplary embodiment of the present invention, and FIG. 9b is a schematic view of a blue or white pixel of an LCD according to a fourth exemplary embodiment of the present invention.

In FIG. 9a, Clcr (or Clcg) ranges from 1.9 to 2.1, Cstr (or Cstg) is 2, Cgdr (or Cgdg) is 0.2, and the width of the portion of the storage electrode line 130RG overlapping the pixel electrode 190RG is 20 μm.

In FIG. 9b, Clcb (or Clcw) ranges from 0.9 to 1.1, Cstb (or Cstw) is 1, Cgdb (or Cgdw) is 0.1, and the width of the portion of the storage electrode line 130RW overlapping the pixel electrode 190RW is 10 μm.

In FIGS. 9a and 9b, the area ratio of the red pixel electrode (or the green pixel electrode) versus the blue pixel electrode (or the white pixel electrode) is 2:1. Accordingly, Clcr (or Clcg): Clcb (or Clcw)=2:1, Cstr (or Cstg): Cstb (or Cstw) is 2:1, and Cgdr (or Cgdg): Cgdb (or Cgdw)=2:1. That is, the ratios of liquid crystal capacitance, storage capacitance, and parasitic capacitance between the red pixel (or the green pixel) and the blue pixel (or the white pixel) are modified to be even.

In this condition, when a mid gray voltage, 20V, is applied, kick-back voltage of the red pixel or the green pixel is calculated according to Equation 1 as follows.

$$Vkbr \text{ (or } Vkbg) = (0.2*20)/(0.2+2+2)$$

$$= 0.952$$

In this condition, when a mid gray voltage, 20V, is applied, kick-back voltage of the blue pixel or the white pixel is calculated according to Equation 1 as follows.

$$Vkbb \text{ (or } Vkbw) = (0.1*20)/(0.1+1+1)$$

$$= 0.952$$

Accordingly, variation of kick-back voltage ΔVkb between the red pixel (or the green pixel) and the blue pixel (or the white pixel) is 0. Therefore, there is no flicker.

When the liquid crystal capacitances Clcr, Clcg, Clcb, and Clcw are increased by 10% due to transition of gray voltage, kick-back voltage of the red pixel or the green pixel is calculated according to Equation 1 as follows $$Vkb \text{ (or } Vkbg) = (0.2*20)/(0.2+2+2.2)$$
$$= 0.909$$

In this condition, kick-back voltage of the blue pixel or the white pixel is calculated according to Equation 1 as follows.

$$Vkbb \text{ (or } Vkbw) = (0.1*20)/(0.1+1+1.1)$$
$$= 0.909$$

Accordingly, variation of kick-back voltage ΔVkb between the red pixel (or the green pixel) and the blue pixel (or the white pixel) is 0. Therefore, there is no flicker. Accordingly, the LCD according to the fourth exemplary embodiment does not have flicker at any gray voltage.

However, the LCD according to the fourth exemplary embodiment which has a discrepancy of total capacitance between the red pixel (or the green pixel) and the blue pixel (or the white pixel) has a discrepancy of charging ratio between the red pixel (or the green pixel) and the blue pixel (or the white pixel).

That is, since the total capacitance of a pixel that will be charged by the on current Ion is different between the red pixel (or the green pixel) and the blue pixel (or the white pixel), the charging time (τ=RC) is also different. In a mid- or large-size LCDs which has a short gate pulse time, such a difference of charging time (τ) induces a discrepancy of charging ratio.

An LCD that does not have a discrepancy of charging ratio will be described as fifth and sixth exemplary embodiments.

Figure 10A:
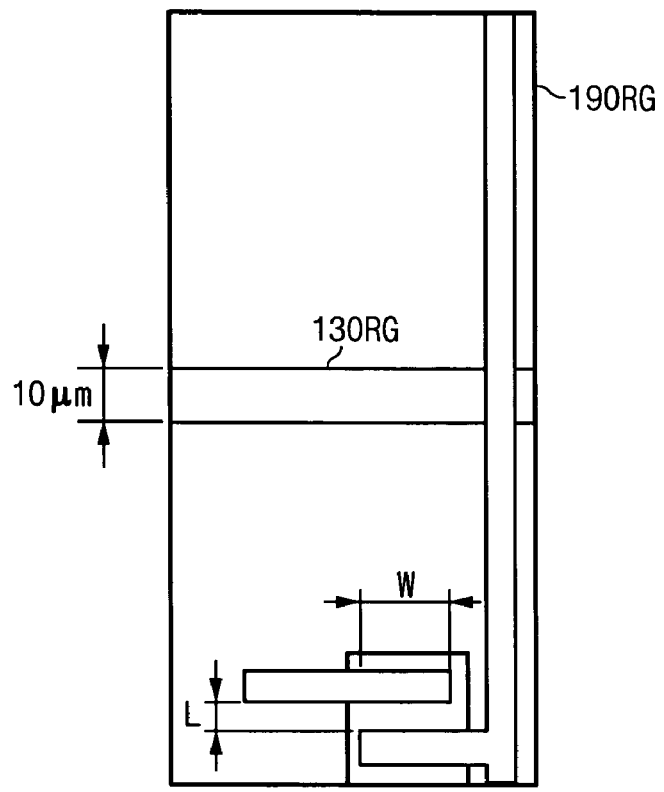
FIG. 10a is a schematic view of a red or green pixel of an LCD according to a fifth exemplary embodiment of the present invention.
Figure 10B:
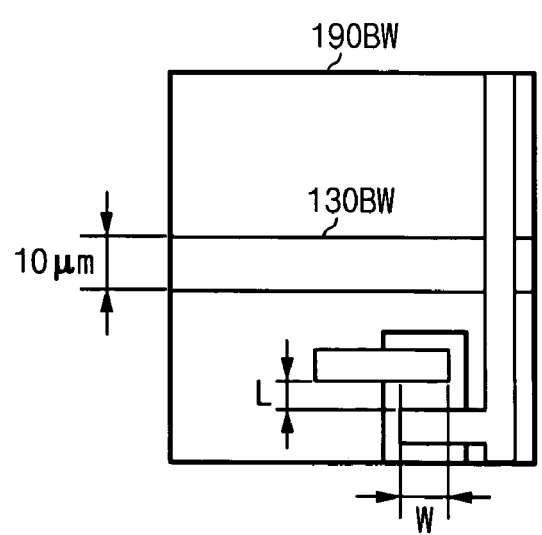
FIG. 10b is a schematic view of a blue or white pixel of an LCD according to a fifth exemplary embodiment of the present invention.

FIGS. 10a and 10b show an LCD according to the fifth exemplary embodiment having a same ratio of total capacitance, parasitic capacitance, and W/L of a TFT between a red pixel (or a green pixel) and a blue pixel (or a white pixel).

FIG. 10a is a schematic view of a red or green pixel of an LCD according to a fifth exemplary embodiment of the present invention, and FIG. 10b is a schematic view of a blue or white pixel of an LCD according to a fifth exemplary embodiment of the present invention.

When Crg, Cbw, Rrg, and Rbw respectively represent total capacitance of the red pixel (or the green pixel), total capacitance of the blue pixel (or the white pixel), resistance of a TFT of the red pixel (or the green pixel), and resistance of a TFT of the blue pixel (or the white pixel), the charging time of the red pixel (or the green pixel) is τrg=Rrg*Crg and the charging time of the blue pixel (or the white pixel) is τbw=Rbw*Cbw.

Here, the charging time of the red pixel (or the green pixel) needs to be the same as the charging time of the blue pixel (or the white pixel). Accordingly, Equation 2 needs to be satisfied.

$$Rrg*Crg=Rbw*Cbw$$

$$(V/Irg)Crg=(V/Ibw)Cbw$$

$$Crg/Cbw=Irg/Ibw \qquad \text{[Equation 2]}$$

Here, Irg an Ibw respectively represent TFT on current of the red pixel (or the green pixel) and blue pixel (or the white pixel). According to Equation 2, when the ratio of on current Ion between the red pixel (or the green pixel) and the blue pixel (or the white pixel) is the same as the ratio of total capacitance between the red pixel (or the green pixel) and the blue pixel (or the white pixel), the charging time of the red pixel (or the green pixel) is the same as that of the blue pixel (or the white pixel).

TFT on current Ion is described as Equation 3.

$$Ion=(W/L)\mu Cox(Vgd-Vth)^2 \qquad \text{[Equation 3]}$$

Here, W, L, μ, Cox, and Vth respectively represent width of a TFT channel, length of the TFT channel, electron mobility of the TFT channel, capacitance between the gate electrode and the semiconductor of the TFT, and threshold voltage of the TFT.

When Equations 2 and 3 are combined, the following equation is produced.

$$Crg/Cbw=Irg/Ibw=(W/L)rg/(W/L)bw$$

Here, (W/L)rg and (W/L)bw respectively represent ratios of channel width and length of the red pixel TFT (or the green pixel TFT) and the blue pixel TFT (or the white pixel TFT).

Accordingly, even though the pixel electrode areas are different between the red pixel (or the green pixel) and the blue pixel (or the white pixel), when the ratios of total capacitance, parasitic capacitance, and W/L of TFT between the red pixel (or the green pixel) and the blue pixel (or the white pixel) are the same, the variation of Vkb is 0 to prevent flicker and the charging time is the same between the red pixel (or the green pixel) and the blue pixel (or the white pixel).

Now, the above-described effect will be concretely described using specific values with reference to FIGS. 10a to 10b.

FIG. 10a is a schematic view of a red or green pixel of an LCD according to a fifth exemplary embodiment of the present invention, and FIG. 10b is a schematic view of a blue or white pixel of an LCD according to a fifth exemplary embodiment of the present invention.

In FIG. 10a, Clcr (or Clcg) ranges from 1.9 to 2.1, Cstr (or Cstg) is 1, Cgdr (or Cgdg) is 0.15, the width of the portion of the storage electrode line 130RG overlapping the pixel electrode 190RG is 10 μm, and (W/L)rg is 30/4 μm.

In FIG. 10b, Clcb (or Clcw) ranges from 0.9 to 1.1, Cstb (or Cstw) is 1, Cgdb (or Cgdw) is 0.1, the width of the portion of the storage electrode line 130RW overlapping the pixel electrode 190RW is 10 μm, and (W/L)bw is 20/4 μm.

In FIGS. 10a and 10b, the area ratio of the red pixel electrode (or the green pixel electrode) versus the blue pixel electrode (or the white pixel electrode) is 2:1.

Accordingly, all of Crg:Cbw, Cgdr (or Cgdg):Cgdb (or Cgdw), and (W/L)rg:(W/L)bw are 3:2. Therefore, variation of Vkb is 0 to prevent flicker, and charging times are the same among pixels.

The fifth exemplary embodiment solves the discrepancy of charging time of the third exemplary embodiment.

Figure 11A:
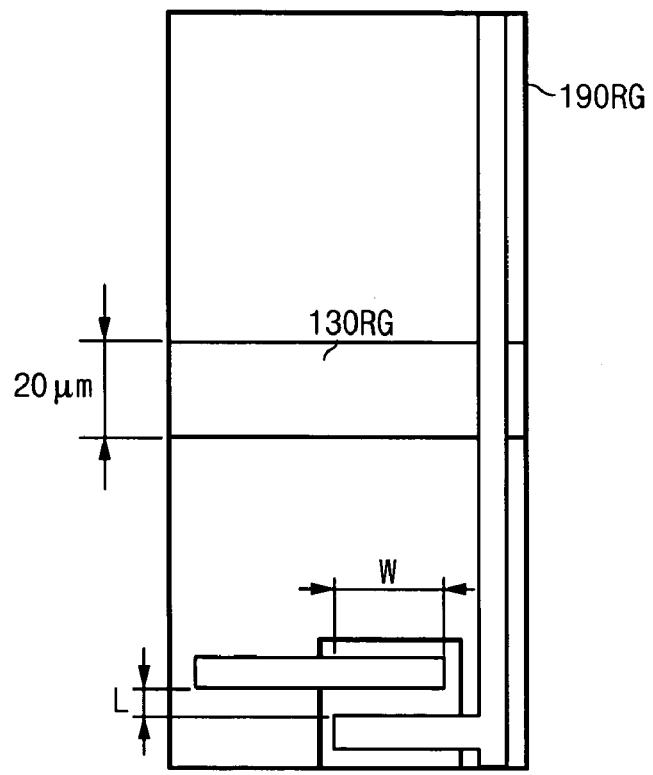
FIG. 11a is a schematic view of a red or green pixel of an LCD according to a sixth exemplary embodiment of the present invention.
Figure 11B:
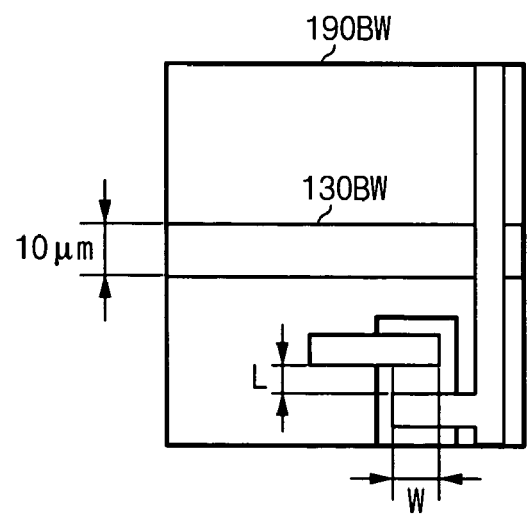
FIG. 11b is a schematic view of a blue or white pixel of an LCD according to a sixth exemplary embodiment of the present invention.

FIGS. 11a and 11b show an LCD according to the sixth exemplary embodiment having a same ratio of total capacitance, liquid crystal capacitance, parasitic capacitance, and W/L of TFT between a red pixel (or a green pixel) and a blue pixel (or a white pixel) using specific values.

FIG. 11a is a schematic view of a red or green pixel of an LCD according to a sixth exemplary embodiment of the present invention, and FIG. 11b is a schematic view of a blue or white pixel of an LCD according to a sixth exemplary embodiment of the present invention.

In FIG. 11a, Clcr (or Clcg) ranges from 1.9 to 2.1, Cstr (or Cstg) is 2, Cgdr (or Cgdg) is 0.2, the width of the portion of the storage electrode line 130RG overlapping the pixel electrode 190RG is 20 μm, and (W/L)rg is 40/4 μm.

In FIG. 11b, Clcb (or Clcw) ranges from 0.9 to 1.1, Cstb (or Cstw) is 1, Cgdb (or Cgdw) is 0.1, the width of the portion of the storage electrode line 130RW overlapping the pixel electrode 190RW is 10 am, and (W/L)bw is 20/4 μm.

In FIGS. 11a and 11b, the area ratio of the red pixel electrode (or the green pixel electrode) versus the blue pixel electrode (or the white pixel electrode) is 2:1.

Accordingly, all of Crg:Cbw, Cgdr (or Cgdg):Cgdb (or Cgdw), (W/L)rg:(W/L)bw, and area ratio of the red pixel electrode (or the green pixel electrode) 190RG versus the blue pixel electrode (or the white pixel electrode) 190BW are 2:1. Therefore, variation of Vkb is 0 to prevent flicker, and charging times are the same among pixels.

The sixth exemplary embodiment solves the discrepancy of charging time of the third exemplary embodiment.

In the above description, LCDs of which ratio of liquid crystal capacitance between the red pixel and the blue pixel is 2:1 are exemplified. However, the present invention may be applied to an LCD of which ratio of liquid crystal capacitance between the red pixel and the blue pixel is other than 2:1.

Figure 12A:
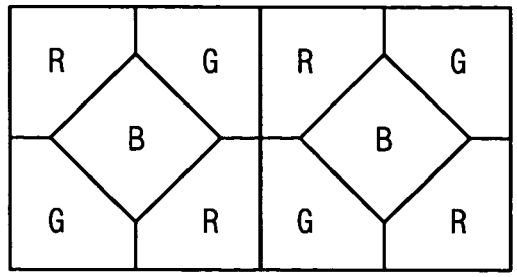
FIG. 12a is a schematic view of PenTile Matrix type of LCD including an enlarged blue pixel electrode.
Figure 12B:
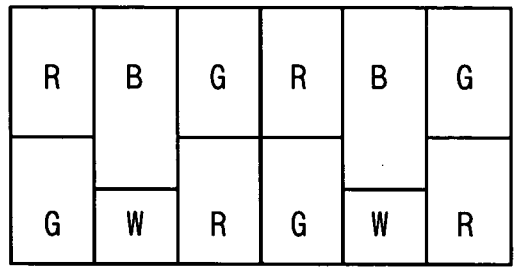
FIG. 12b is a schematic view of a P1 type of RGBW LCD having a reduced white pixel electrode.
Figure 12C:
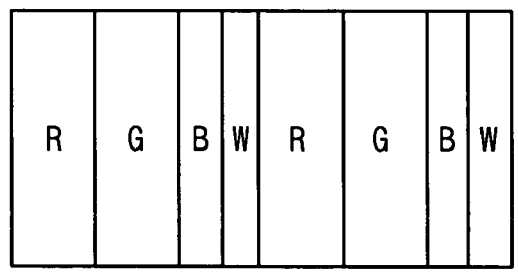
FIG. 12c is a schematic view of a stripe type of RGBW LCD having reduced white and blue pixel electrodes.
Figure 12D:
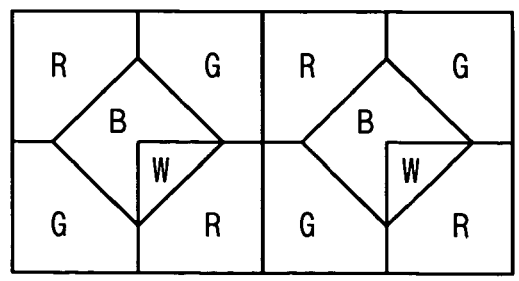
FIG. 12d is a schematic view of a P2 type of RGBW LCD having a reduced white pixel electrode.

In the above description, LCDs having a P2 type of RGBW pixel structure are exemplified. However, the present invention may be applied to a PenTile Matrix type of LCD having an enlarged blue pixel electrode as shown in FIG. 12A, a P1 type of LCD having reduced blue and white pixel electrodes as shown in FIG. 12B, a stripe type of LCD having reduced blue and white pixel electrodes as shown in FIG. 12C, and a P2 type of LCD having a reduced white pixel electrode as shown in FIG. 12d because they have unequal pixel electrode areas among pixels.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
an insulating substrate;
a plurality of gate lines formed on the insulating substrate;
a plurality of data lines formed on the insulating substrate and crossing the gate lines;
a plurality of switching elements connected to the gate lines and data lines; and
a plurality of pixel electrodes connected to the switching element, and
wherein dots each having red, green, blue, and white pixels are successively arranged, and total capacitance of each pixel, which consists of liquid crystal capacitance and storage capacitance, is equal.

2. The liquid crystal display of claim 1, wherein one of the pixels included in a dot has a different pixel electrode area from the others.

3. The liquid crystal display of claim 1, wherein two of the pixels included in a dot have different pixel electrode area from the others.

4. The liquid crystal display of claim 3, wherein the red pixel electrode and the green pixel electrode have the same area, the blue pixel electrode and the white pixel electrode have the same area, and the sum of areas of the red and green pixel electrodes is different from the sum of areas of the blue and white pixel electrodes.

5. The liquid crystal display of claim 4, wherein when the ratio of liquid crystal capacitance of the red and green pixels versus the blue and white pixels is a:b, and the ratio of storage capacitance of the red and green pixels versus the blue and white pixels is c:b, the equations a +c=b+d and 1/2<c/d<1 are satisfied.

6. A liquid crystal display comprising:
an insulating substrate;
a plurality of gate lines formed on the insulating substrate;
a plurality of data lines formed on the insulating substrate and crossing the gate lines;
a plurality of switching elements connected to the gate lines and data lines; and
a plurality of pixel electrodes connected to the switching element, and
wherein dots each having red, green, blue, and white pixels are successively arranged, liquid crystal capacitance of the red and green pixels is larger than that of the blue and white pixels, parasitic capacitance of the red and green pixels is larger than that of the blue and white pixels, and kick-back voltages of the red, green, blue, and white pixel are equal.

7. A liquid crystal display comprising:
an insulating substrate;
a plurality of gate lines formed on the insulating substrate;
a plurality of data lines formed on the insulating substrate and crossing the gate lines;
a plurality of switching elements connected to the gate lines and data lines; and
a plurality of pixel electrodes connected to the switching element, and
wherein dots each having red, green, blue, and white pixels are successively arranged, and all of the ratios of liquid crystal capacitance, storage capacitance, and the parasitic capacitance between the red and green pixels and the blue and white pixels are the same.

8. A liquid crystal display comprising:
an insulating substrate;
a plurality of gate lines formed on the insulating substrate;
a plurality of data lines formed on the insulating substrate and crossing the gate lines;
a plurality of switching elements connected to the gate lines and data lines; and
a plurality of pixel electrodes connected to the switching element, and
wherein dots each having red, green, blue, and white pixels are successively arranged, and the ratios of total capacitance including liquid crystal capacitance and storage capacitance, the parasitic capacitance, and ratio of channel width and length (WL) of the switching element between the red and green pixels and the blue and white pixels are the same.

9. A liquid crystal display comprising:
an insulating substrate;
a plurality of gate lines formed on the insulating substrate;
a plurality of data lines formed on the insulating substrate and crossing the gate lines;
a plurality of switching elements connected to the gate lines and data lines; and
a plurality of pixel electrodes connected to the switching element, and
wherein dots each having red, green, blue, and white pixels are successively arranged, and the ratios the liquid crystal capacitance, the storage capacitance, the parasitic capacitance, and the ratio of channel width and length (W/L) of the switching elements between the red and green pixels and the blue and white pixels, are the same.

10. A liquid crystal display comprising
an insulating substrate,
a plurality of gate lines formed on the insulating substrate,
a plurality of data lines formed on the insulating substrate and crossing the gate lines,
a plurality of switching elements connected to the gate lines and data lines, and
a plurality of pixel electrodes connected to the switching element,
wherein red, green, blue, and white pixel electrodes are respectively formed on the red, green, blue, and white pixels; two red pixel electrodes, two green pixel electrodes, one blue pixel electrode, and one white pixel electrode are comprised in a dot; the red and green pixel electrodes are sequentially aligned along a row and column; the blue and white pixel electrodes form a lozenge extending over two pixel columns; two red pixel electrodes are respectively included in two adjacent pixel columns and face each other obliquely while the lozenge formed of the blue and white pixel electrodes is disposed between them; a data line is disposed between the blue and white pixel electrodes; the blue and white pixel electrodes are respectively connected to the switching elements; and the ratios of the liquid crystal capacitance, the storage capacitance, the parasitic capacitance, and the ratios of channel width and length (WL) of the switching elements between the red and green pixels and the blue and white pixels are the same.

11. The liquid crystal display of claim 1, wherein the red, blue, green, red, blue, and green pixels are sequentially aligned along a first column, and green, white, red, green, white, and red pixels are sequentially aligned along a second column which is adjacent to the first column.

12. The liquid crystal display of claim 11, wherein the red and green pixels are alternately aligned along a first row, and blue and white pixels are aligned along a second row to form lozenges.

* * * * *